(12) United States Patent
Nichols

(10) Patent No.: US 7,023,213 B2
(45) Date of Patent: Apr. 4, 2006

(54) SUBSURFACE CONDUCTIVITY IMAGING SYSTEMS AND METHODS

(75) Inventor: Edward Nichols, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/315,795

(22) Filed: Dec. 10, 2002

(65) Prior Publication Data
US 2004/0108854 A1    Jun. 10, 2004

(51) Int. Cl.
*G01V 3/00* (2006.01)

(52) U.S. Cl. .................................... 324/348

(58) Field of Classification Search ............. 324/323, 324/338–343, 348–350; 702/6–7
See application file for complete search history.

(56) References Cited

U.S. PATENT DOCUMENTS

| | | | |
|---|---|---|---|
| 1,910,709 A * | 5/1933 | Mortenson .................. | 324/348 |
| 4,210,869 A * | 7/1980 | Groenendyke et al. ..... | 324/349 |
| 4,616,184 A * | 10/1986 | Lee et al. .................. | 324/335 |
| 4,617,518 A * | 10/1986 | Srnka ........................ | 324/365 |
| 4,809,243 A | 2/1989 | Bledsoe et al. | |
| 4,835,473 A * | 5/1989 | Bostick, Jr. ............... | 324/350 |
| 4,958,329 A | 9/1990 | Marschall | |
| 5,381,382 A | 1/1995 | Marschall | |
| 5,770,945 A | 6/1998 | Constable | |
| 6,191,587 B1 * | 2/2001 | Fox ............................ | 324/350 |
| 6,339,333 B1 | 1/2002 | Kuo | |
| 6,466,021 B1 * | 10/2002 | MacEnany .................. | 324/350 |
| 6,628,119 B1 | 9/2003 | Eidesmo et al. | |
| 6,677,757 B1 | 1/2004 | Fine et al. | |
| 6,696,839 B1 | 2/2004 | Ellingsrud et al. | |
| 6,717,411 B1 | 4/2004 | Ellingsrud et al. | |
| 6,720,771 B1 * | 4/2004 | Gupta et al. ................ | 324/339 |

FOREIGN PATENT DOCUMENTS

| | | |
|---|---|---|
| EP | 0508904 | 4/1992 |
| EP | 1191351 | 3/2002 |

(Continued)

OTHER PUBLICATIONS

A.G. Nekut and Brian Spies, Petroleum Exploration Using Controlled-Source Electromagnetic Methods, Proceedings of the IEEE, vol. 77, No. 2, Feb. 1989, pp. 338-362.*

*Primary Examiner*—Bot Ledynh
*Assistant Examiner*—Reena Aurora
(74) *Attorney, Agent, or Firm*—Kevin P. McEnaney; Bryan L. White; Victor H. Segura

(57) ABSTRACT

A subsurface imaging cable includes a plurality of sensor modules, wherein the plurality of the sensor modules are flexible and each of the plurality of the sensor modules is spaced apart on the subsurface imaging cable at a selected distance; and a flexible medium connecting the plurality of the sensor modules, wherein the subsurface imaging cable is flexible and adapted to be wound on a reel. A method for subsurface images includes acquiring direct-current measurements at a plurality of sites in a survey area; acquiring a first set of electric and magnetic measurements from natural electromagnetic fields at the plurality of sites; acquiring a second set of electric and magnetic measurements using controlled electric and magnetic sources at the plurality of sites; and determining a subsurface conductivity distribution from the direct-current measurements and the first set and the second set of electric and magnetic measurements.

2 Claims, 5 Drawing Sheets

FOREIGN PATENT DOCUMENTS

| | | |
|---|---|---|
| EP | 1096271 | 8/2003 |
| WO | WO01/57555 A1 | 8/2001 |
| WO | WO02/14906 A1 | 2/2002 |
| WO | WO03/034096 A1 | 4/2003 |
| WO | WO03/048812 A1 | 6/2003 |
| WO | WO03/104844 A1 | 12/2003 |
| WO | WO04/008183 A2 | 1/2004 |
| WO | WO04/053528 A1 | 6/2004 |

* cited by examiner

SUBSURFACE CONDUCTIVITY IMAGING SYSTEMS AND METHODS

FIELD OF THE INVENTION

The present invention relates to methods and apparatuses for imaging subsurface resistivities.

BACKGROUND OF THE INVENTION

Hydrocarbon exploration typically involves various geophysical methods to detect the presence of hydrocarbons in the natural void space of the rock (measured as "porosity") or to map structural features in a formation of interest which are capable of trapping hydrocarbons.

To be mapped geophysically, the formation containing the hydrocarbon must possess a physical property contrast that the geophysical method responds to. For example, seismic waves reflect off interfaces between rock types that have different seismic impedance (the product of velocity and density). The velocities of seismic waves traveling in a medium depend primarily on the elastic constant and density of the medium (e.g., rocks). The density of the medium in turn depends on the porosity and fluid content. The seismic wave velocity is sensitive to porosity, but not sensitive to the type of fluid in the pores, although it is sensitive to the presence of gas.

The electrical conductivity ($\sigma$), or its inverse, resistivity ($\rho$), is a physical property that can be measured with electrical or electromagnetic (EM) methods. The resistivity of a rock depends strongly on the resistivity of the pore fluid and even more strongly on the porosity of the rock. Typical brine in sedimentary rock is highly conductive. The presence of brine in bulk rock renders the rock conductive. Hydrocarbons are electrically non-conductive. Consequently, bulk resistivity of a rock is reduced when hydrocarbons are present. In general, different rocks in a given sedimentary section have different porosities, so even in the absence of hydrocarbons, information about the sedimentary section can be determined. The combination of seismic and resistivity data is useful in assessing hydrocarbon content.

Resistivity is typically measured with a direct current (DC) source that injects current into the ground or with low frequency time varying fields. The former currents satisfy Laplace's equation and the latter satisfy the diffusion equation. The electromagnetic (EM) methods described herein may use DC and/or diffusion fields.

Diffusion of time-varying electric and magnetic fields in a conductor is basically an induction phenomenon. In EM measurements, a current is made to flow in a formation, and the voltage drops produced by the current is then measured. Alternatively, one may measure the magnetic fields produced by the induced current. Currents can be made to flow in the formations by injection using contacting electrodes. A current injection source produces a DC response. Alternatively, currents may be made to flow in the formations by using an inductive source, i.e., by creating a time-varying magnetic field that induces an electromotive force (emf) or voltage in a conductor (e.g., an earth formation) according to Faraday's Law. The induced emf or voltage in turn drives a secondary current (eddy current or Faraday current) whose magnitude depends on the conductivity of the conductor (e.g., the earth formation). Thus, by measuring the magnitude of the induced current or the secondary magnetic fields arising from these, it is possible to infer the conductivity of the earth formation. Other important sources for inducing current flows in an earth formation are natural electromagnetic fields. The present invention relates to methods for using these sources/fields to determine resistivities in a given geologic section in the formations.

In order to fully explain the present invention, description of related prior art techniques is required.

Seismic Analysis

As noted above, seismic methods may be used to explore hydrocarbons located in earth formations. These methods involve emitting seismic waves into earth formations and receiving the reflected and/or diffracted seismic waves from the earth formations. Acoustic waves reflect off interfaces between different types of rocks with dissimilar seismic impedances. The velocities of the reflected or diffracted seismic waves depend on the densities of the rocks, which are in part due to the porosities and fluid contents of the rocks. However, the velocities of the reflected or diffracted seismic waves are not sensitive to the type of fluids (e.g., water or oils) in the pores, except for the presence of gas. Thus, seismic methods are useful in mapping the interfaces between different types of rocks.

FIG. 1 shows a typical arrangement for undertaking a marine seismic survey. A seismic vessel (1) drags one or more seismic source cables (3) over a plurality of seismic receiver cables (7). The seismic source cables (3) have a series of sources (5) for producing pressure waves, and the seismic receiver cables (7) have a series of receivers (9) to detect the reflected or diffracted seismic waves. A seismic survey is performed by sending pressure waves downward to the seafloor (11) and into the subsea formations. The seismic waves that are reflected or diffracted from the subsea formations are then recorded by the receivers (9) that are in direct contact with the seafloor (11). With each pressure wave, the array of receivers (9) on the seismic receiver cable (7) register a reflection and diffraction pattern. Typically, several measurements of the reflection and diffraction patterns are made in a survey. These measurements are then used to map the geological formations having strata and faults, etc.

The seismic cable systems are well developed, having most of the necessary technology for deployment and positioning. In addition, rugged marine connectors capable of operating to great depths in the harsh marine environment have been developed, and modern seismic cables are available in great lengths (e.g., 6 Km or longer). A seismic cable usually carries a series of receivers spaced apart every tens or hundreds of meters. Thus, a modern seismic cable is capable of sampling a broad area in a seismic survey. This feature of the seismic cables may be used to facilitate other types of measurements (e.g., EM measurements).

DC Resistivity

The basic concept in measuring resistivity of a formation is to cause a current to flow in the formation and then measure the resultant voltage drops across spaced apart electrodes or measure the magnetic fields produced by the current. The first such measurements, performed by the Schlumberger brothers (1934), consisted of injecting a current between one pair of electrodes in the formation and measuring the voltage drop across another pair. This general concept is still widely used in the petroleum industry and is known as the DC resistivity method. With the DC resistivity method, the depth of investigation is proportional to the overall spacing of the electrodes used in an array. For depths beyond a few hundred meters, the array size becomes impracticable. In addition, for many applications, it is difficult and costly to provide sufficient current for a large array.

The DC resistivity method may also be used on the ocean floor despite the presence of a highly conductive layer (seawater) disposed above the measurement plane. The detectable voltage drops in the resistive sea floor are small, as compared to the surrounding seawater. Nevertheless, because seawater resistivity is essentially constant, very small changes in the observed voltage drops under the sea floor can be interpreted accurately.

One complication in DC resistivity measurement arises when the sub-bottom (e.g., beneath the sea floor) is layered. In this case, to recover information at a greater depth, the separation between the electrodes at a single site must be increased. This is known as an expanding array, and this mode of survey is known in the art as sounding. If the sub-bottom is inhomogeneous, the expanding array must also be laterally moved in order to obtain the spatial distribution of the resistivity. The implementation of such an array is logistically difficult because significant lengths of cables must be moved for each individual measurement.

Accordingly, to acquire the maximum amount of information efficiently, an array consisting of two relatively short dipoles of length a separated by an integer (n) multiple of a (i.e., na) is used. A complete measurement profile consists typically of a set of voltage readings at successive distances to one side (i.e., to the right) of the transmitter. The transmitter is then moved one dipole length to the right and another set of voltages is acquired. The process is then repeated to cover the survey area. If the sampling sites are dense, this dipole-dipole array may provide nearly "continuous" coverage along the survey profile.

As noted above, in DC resistivity measurements, the depth of investigation depends on the overall spacing of the array. Lateral information is obtained by moving the array along the surface. Arrays with small spacing moved in small increments reveal resistivity variations close to the surface, while arrays with large spacings moved in large increments can reveal both near surface and deeper variations. Ideally, a complete suite of data for all spacings and all lateral positions should be acquired to generate a complete "picture" of the subsurface formation. However, the actual data collection and analysis to derive the resistivity distribution is limited by the underlying physics and the practical considerations of making measurements (e.g., spacing and cable length). In addition, current density falls off quickly with distance when using a dipole transmitter. Consequently, the perturbations caused by an inhomogeneity beyond a given depth may be immeasurable due to background noises at the receiver. Ideally there should be a multiplicity of transmitters and receivers disposed over the surface of the ground to recover the three dimensional distribution of ground resistivity. Except for surveys to recover the resistivity of shallow depths, such arrays of current and potential electrodes are impractical (uneconomic) on land, but practical and feasible on the sea bottom as described herein.

Induced Polarization (IP) measurements, which are closely related to DC measurements, may be useful in rocks containing clay or metallic minerals because resistivities in these rocks are complex and frequency-dependent. The IP effect is typically observed with a source having frequencies in a range between 0.01 and 1000 Hz. If resistivity data are acquired at frequencies in this range, in background conductivities, and with array sizes small enough so that background induction effects are negligible, then the in-situ IP effect may be determined from array measurements. IP surveys have been used in petroleum exploration to detect disseminated pyrites that have precipitated in some formations due to reducing chemical environment created by the upward migration of methane from underlying petroleum reservoirs. IP measurements may also be used to survey ocean bottom resistivities. In this case, the frequencies used should be very low to avoid the frequency-dependent induction effects from the overlying ocean. However, because the ocean conductivity is known and constant, even if the frequency-dependent induction effects contribute to the measurement data, they can be removed by applying a first order correction.

Magnetotellurics

Magnetotellurics (MT) is a low-frequency electromagnetic induction method for determining the subsurface distribution of electrical resistivity using measurements of naturally occurring magnetic and electric fields on the earth or at the ocean bottom. The MT method is an ideal complement to seismic methods in areas where seismic methods are difficult to implement. In particular, the MT method is most effective in geologic situations where rocks having greatly different electrical resistivity are juxtaposed. Carbonates, volcanics, and salt all have large electrical resistivity contrasts with typical sedimentary rocks. Consequently, MT measurement is a preferred method for investigating formations of these rocks.

In general, there are two common sources of natural electrical and magnetic fields that can be used in MT measurements. One source results from the complex interactions between the Earth's ionosphere and magnetosphere and a plasma stream ejected from the sun (known as solar wind). The second source arises from electromagnetic waves that result from lightning discharges and propagate in the Earth ionosphere cavity.

Changing magnetic fields from these natural sources induce an electromotive force (emf) in the ground according to Faraday's Law. The induced emf in turn drives currents in the earth; these currents are called telluric currents. The surface electric field, E, resulting from the emf or telluric currents can be measured as the voltage drop ($\Delta V$) between two electrodes implanted in the ground at a distance L apart. The surface electric field is then defined as $E=\Delta V/L$.

The great distance between the natural sources of electromagnetic radiation and the earth surface means that the electromagnetic radiations arrive at the earth surface as plane waves. Therefore, the earth surface around a large area can be assumed to be homogeneously irradiated by the same electromagnetic field, and, if the ground is homogeneous, measurements (E or H) made at any location within that large area should provide the same results in the absence of interferences. These natural fields may be noise for the dc method or for the controlled source em methods (below). Thus, an MT measurement at a remote reference site may be used to correct for natural field contributions in other EM measurements.

As shown in FIG. 2, when incident fields reach the earth surface, some of these fields are transmitted into the formation and some are reflected. Various components of the electric (E) or magnetic (H) fields are defined as:

$$E^{incident}(z)=E_0 e^{-ik_0 z}$$

$$E^{reflected}(z)=E_1 e^{+ik_0 z}$$

$$E^{transmitted}(z)=E_2 e^{-ik_1 z}$$

$$H^{incident}(z) = H_0 e^{-ik_0 z}$$

$$H^{reflected}(z) = H_1 e^{+ik_0 z}$$

$$H^{transmitted}(z) = H_2 e^{-ik_1 z} \quad (1)$$

where $k_1^2 = -i\omega\mu\sigma_1$ and $k_0^2 = \omega^2\mu_0\epsilon_0$, i is a notation for the complex number=sqrt(-1), $\omega$ is the frequency in radians/sec, $\sigma$ is the electrical conductivity in Siemens/m, $\mu$ is the magnetic permeability, $\epsilon$ is the dielectric permittivity of free space, and z is the surface impedance.

Analysis of the reflection physics involved shows that the ratio of the measured magnetic field to the orthogonal electric field at the surface of a uniform half-space of resistivity $\rho$ is given by:

$$\frac{E}{H} = \sqrt{i\omega\mu\rho} = Z \quad (2)$$

where Z is the surface impedance. From equation (2), the ground resistivity $\rho$ (or $\rho_A$ in a layered or inhomogeneous formation) can be derived as:

$$\rho_A = \frac{1}{\omega\mu}\left|\frac{E}{H}\right|^2 \quad (3)$$

Another important property of the fields is the reflection coefficient at the earth surface. The reflection coefficient for the electric field is the ratio of the reflected amplitude to the incident amplitude of the electric field and can be defined as:

$$\frac{E_1}{E_0} = R_E = \frac{k_0 - k_1}{k_0 + k_1} \quad (4)$$

Similarly, the reflection coefficient for the magnetic field is defined as:

$$\frac{H_1}{H_0} = R_H = \frac{k_1 - k_0}{k_1 + k_0} \quad (5)$$

Because the frequencies of the natural electromagnetic radiations are less than $10^5$ Hz, $k_0 \ll k_1$ for all earth formations. Thus, $R_E$ is close to −1 and $R_H$ is close to +1. Because the measured field (electric or magnetic) at the interface is the sum of the incident, reflected and transmitted energy, the measured magnetic field is basically doubled and the electric field is reduced to nearly zero. Therefore, the measured electric field on the surface of the earth is sensitive to changes in ground resistivity, while the measured magnetic field is insensitive to the ground resistivity. The situation is reversed at the sea floor due to the presence of highly conductive sea water above lesser conducting sediments below. At sea floor, the magnetic field is sensitive to changes in ground resistivity, while the electric field is not.

Plane wave fields at the surface diffuse into the ground with their amplitudes attenuated exponentially with depth. Low frequency waves penetrate more deeply into the ground than do higher frequency waves; this is the skin-depth effect. The skin depth, $\delta$, is the depth at which a plane wave is attenuated to 1/e of its magnitude at the surface. The skin depth is defined as:

$$\delta = \sqrt{\frac{2}{\omega\mu\sigma}} = \sqrt{\frac{2\rho}{2\pi f 4\pi \cdot 10^{-7}}} \approx 500\sqrt{\frac{\rho}{f}} \quad (6)$$

where $\rho$ is the ground resistivity and f is the frequency of the waves.

Equation (6) shows that the depth of investigation is dependent on the frequency f—lower frequencies produce larger skin depths and higher frequencies produce smaller skin depths. The available spectrum of the natural fields has frequencies ranging from $10^{-4}$ Hz to $10^4$ Hz. These natural fields can produce depths of investigation from a few tens of meters to a few tens of kilometers in typical geologic formations. In a layered half-space, the resistivity obtained using the above formula for $\rho_A$ (see equation (3)), is roughly equal to the average resistivity of layers down to the skin-depth.

Surface impedance Z as shown in Equation (2) is an invariant function defined by the properties of the subsurface formations. In general, the surface impedance Z is a tensor that relates the horizontal, orthogonal components of the electric field E to the same components of the magnetic field H:

$$\begin{vmatrix} E_x \\ E_y \end{vmatrix} = \begin{vmatrix} Z_{xx} & Z_{xy} \\ Z_{yx} & Z_{yy} \end{vmatrix} \cdot \begin{vmatrix} H_x \\ H_y \end{vmatrix} \quad (7)$$

In Equation (7), each element ($Z_{ij}$) in the impedance tensor Z is related to the subsurface conductivity distribution. Therefore, determination of the tensor elements provides, for example, the conductivity of the subsurface structures in the survey area.

At any point on the surface of the earth, the impedance tensor (Z) is unique for that particular location. A complete description of the subsurface resistivity distribution would require that the impedance be measured all over the surface, which is logistically and economically impracticable. As a practical alternative, the impedances are often measured at sites chosen so that variations in the resistivity are adequately sampled. Unfortunately, this discrete sampling approach is not satisfactory if the near surface is highly inhomogeneous. For example, the inhomogeneity at near surface would lead to discontinuous electric fields, i.e., a particular survey site (sampling site) may have an electric field biased up or down. This results in static offsets that pose significant problems in interpreting the MT data. Thus, it is desirable to acquire dense coverage of the survey area in MT measurements so that this problem is minimized. Unfortunately dense coverage on land is often precluded by practical problems of access, powerline noise, habitation etc. The interpretation of MT data consists of determining the distribution of resistivity in the ground that produces surface impedances which match the observed impedances.

MT measurement is typically performed with an apparatus shown in FIG. 2. The apparatus of FIG. 2 has two pairs of orthogonal electrodes (or electric sensors) (13) and two pairs of orthogonal magnetic sensors (15). The electrodes (13) and magnetic sensors (15) measure the electric and magnetic fields, respectively. This type of MT system typically relies on acoustic positioning in deep water and, thus, may suffer from positioning errors. In addition, the separation between each pair of electrodes (13) on the opposite ends of a rod is typically only several meters (e.g., 10 meters or less). This short separation provides a short dipole length that limits the achievable signal-to-noise (S/N) ratios, because the achievable S/N ratios are proportional to the measurement dipole length.

Controlled Source Methods

Controlled source electromagnetic (CSEM) methods provide several practical and theoretical advantages over the DC Resistivity and MT methods. As the name implies, the source of the fields in CSEM is a finite size transmitter in which a known current is made to flow in the formations by a suitable generator or power supply. The fact that the source field is known distinguishes the CSEM methods from MT. Only the ratios of electric to magnetic fields are in the MT measurements for determining ground resistivity. Consequently, only relative variations in subsurface conductivity can be determined from the magnetic or electric fields alone.

In CSEM systems, a circular loop of wire carrying a time-varying current is typically used as a controlled magnetic field source. This produces a time-varying magnetic field in the surroundings. The time-varying magnetic field in turn (according to Faraday's Law) produces an emf or voltage, which drives currents in the ground. The currents in the ground produce voltage drops at the surface. The voltage drops may be directly measured as in the DC resistivity or MT methods. However, the secondary magnetic fields produced by these currents are usually measured. The resistivity is then inferred from the magnitude of secondary magnetic fields.

A grounded electric dipole is also a good source for electromagnetic (EM) fields if the source current is time-variable. The currents injected into a formation by such an electric dipole have a time-varying field, which induces Faraday currents that flow in the formation in addition to the directly injected current. The advantage of this source is that, at low frequencies, it can be used for conventional resistivity and IP measurements and, at higher frequencies, it can be used for EM measurements. The added variable of frequency in CSEM can be used to reduce the non-uniqueness of the solutions derived from DC measurements.

While a controlled source is often described in terms of a sinusoidally varying field, which is referred to as the frequency domain, the actual field systems often use a step or pulse field, which is referred to as the time domain. The time domain EM systems have the advantage that the secondary fields are measured after the primary field is turned off. If the secondary fields are small, it may be technically difficult to measure them in the frequency domain because of the presence of much larger primary field. Almost all controlled source systems now operate in the time domain.

There are several theoretical and practical considerations for choosing between natural field and controlled source methods for any given application. The basic fact is that over an inhomogeneous half-space, the response depends on the spatial variation of an incident field as well as its frequency. In MT, the incident fields are uniform and are zero wave number fields. Although the inhomogeneity in the formation may create higher wave numbers from the natural fields, such low order wave number field cannot provide coverage as wide as that provided by the controlled source. As in MT, spatial variability of the controlled source methods is described by Fourier transform of the spatial description of the field.

Another theoretical difference between MT and CSEM is that they each sample different volumes of the ground. For example, in MT, the induced currents are vast sheet-like flows, the magnitudes and phases of these induced currents are influenced by large-scale, regional geology. With controlled sources the primary or the induced secondary field falls off very quickly from the source, as do the induced currents. Consequently, the measured secondary fields in CSEM are sensitive to a volume of ground having a dimension on the same order as the source-receiver configuration dimension.

A simple example of the detection of a thin resistive layer illustrates fundamental differences between the MT and CSEM systems. It can be shown that within a layered ground, the induced currents flow only in planes parallel to the layers. The resistive layer looks like a large resistor in parallel with many small ones. A thin resistive layer can pose a difficult problem for MT measurements because it can reduce signal magnitudes beyond detection by MT as the layer resistivity increases. In the limit of a layer of free space (i.e. infinite resistivity), no response can be detected. The situation is true for all purely inductive sources.

The only source for which this is not true is the horizontal electric dipole. As noted above, the electric dipole source can produce fields of all frequencies, including the zero frequency (i.e., DC field). In the DC limit, currents flow vertically in the Earth. If a resistive layer is present, they are prevented from flowing deeper into the section. In the limit of an air-filled layer (i.e. infinite resistivity), no current flows below the layer. As the frequency of the electric dipole increases, the induction effects gain influence and force the currents to flow horizontally and eventually the thin resistive layer becomes transparent. Thus, while a thin resistive layer may pose a problem for measurements using DC or low frequency sources (e.g., MT), it poses little problem for measurements using high frequency sources (e.g., CSEM). Similarly, pronounced differences between MT and CSEM occur between different configurations over inhomogeneous ground.

In general, EM systems that have been developed to date have been designed primarily for sounding or for profiling to locate discrete conductors. These prior art systems have been developed around a stationary source with roving receivers, fixed receivers with a roving source, a fixed transmitter-receiver that is moved over the surface, or combinations of these. Both electric and magnetic fields can be detected from either electric or magnetic dipole sources. Furthermore, it is possible to detect specific components of the field with respect to a particular direction of the source.

On land, the choice of a system, and particularly the choice of field to be measured and its direction, depends on the physics of the response and which fields are most sensitive to the expected subsurface resistivity distribution. Land CSEM involves the task of implanting current electrodes and having high power current supplies to drive currents through the contact or grounding resistance. To achieve high moments with a vertical magnetic dipole (VMD) source, a large surface loop and high current are required. The cost of creating arrays of such transmitters on land is uneconomical.

Despite these difficulties, several large-scale low frequency systems have been implemented over the years with megawatt power supplies for deep exploration. Because the noise in the magnetic field sensors is comparable to the natural field noise, overpowering the natural fields and using narrowband signal averaging provide the only accurate measurements possible. Commercial systems using a large grounded electric dipole source were used in petroleum exploration in the 70's and 80's. However, interpretation of subsurface features based on multiple measurements from a single large source often leads to ambiguities that render the method useless. Nevertheless, these systems provide a lesson, albeit costly, on the importance of wide spatial coverage for both transmitters and receivers.

The response of CSEM systems on the ocean bottom is dramatically affected by the presence of the overlying conductive layer. The insights gained from surface CSEM systems are not applicable and the inverted boundary conditions alter the sensitivity of the fields to the sub-bottom resistivity as they do for MT. A good description of some of these considerations is given by Chave et al. for sounding application. See e.g., Chave, A. D. et al., "*Electrical Exploration Methods for the Seafloor*," in Electromagnetic Methods in Applied Geophysics, (Nabighian, M. N. Ed.), 02: 931–966, Society of Experimental Geophysics. This article notes that the horizontal electric and horizontal magnetic dipole (HMD) sources are the best when the bottom is much more resistive than the seawater, and either the vertical magnetic dipole (VMD) (horizontal loop) or horizontal magnetic dipole is effective if the contrast with the bottom is small. Unlike the situation on land, an HMD source can produce a vertical component of a current that is sensitive to resistive layers.

The main consideration in designing a marine CSEM system is the intended depth of exploration and hence the separations and frequency bandwidth needed. The response of ground to any inductive source depends on the frequency of the source. Thus, if low frequencies are used to probe a given depth, the measured secondary fields will be very small. To obtain useable data, the source moment—the product of the current, the number of turns, and the area of the loop for a magnetic 'dipole' or the product of the current and the length for an electric dipole—must be large, and the signal averaging must also be large.

In marine applications, some of the advantages of the controlled source methods can be realized without the constraints of land systems. Marine electromagnetic surveys using a towed electric dipole source are practical because a powerful source is relatively easy to implement and it can be dragged conveniently over the bottom to provide wide spatial coverage. With weight not a strong constraint, it is also possible to build long solenoidal magnetic dipole to employ HMD systems.

Interpretation

For all the systems described (DC resistivity, IP, MT, and CSEM), the interpretation of the survey data consists of determining the distribution of electrical conductivity that explains the observed data. Different systems respond differently to a given conductivity distribution because each of these systems uses a different source, which in turn produces a different secondary field and, therefore, a different response. Because each of these systems produces different responses to a given conductivity distribution, combining data obtained with these different systems will provide a more accurate description of the conductivity distribution.

With all systems described herein, the responses depend on the form or spatial configuration of the imposed field. With the inductive methods (MT and CSEM), the responses also depend on the frequencies of the sources, while with the DC method, the responses depend on the relative position and spacing of the current electrodes. The response should ideally be measured at all points on the ocean bottom because the configuration of currents in the subsea bottom dictates the amplitude and pattern of electric fields measured by the receiving electrodes (the data). Repeat measurements using different sources yield better information about the subsurface conductivity distribution because the responses vary with different configurations of the currents imposed by the different sources. Thus, with different measurements using different sources, it is like illuminating the subsurface with different currents.

However, on land, it is not practical to measure the electric field continuously (e.g., with a large number of densely-packed sampling points), nor is it practical to move the transmitting electrodes continuously as would be necessary if the subsurface were to be "illuminated" by all possible configurations of the injected currents.

Because of the difficulties in obtaining data for continuous coverage surveys on land, prior art methods instead use discrete arrays in which current injection and voltage measuring electrodes are regularly spaced, typically along a profile. In such arrays, the electrode spacing is referred to as a sampling interval. Because these measurements are obtained along a profile, restricted models of the subsurface conductivities, in which subsurface conductivities are assumed not to vary in the direction perpendicular to the profile line, are typically used in the interpretation of these data. While it is impractical to have electrodes occupying densely-packed points on a two dimensional grid on land to provide continuous coverage, such configurations are feasible using the marine systems described herein.

In MT, the source field is uniform; it has no horizontal spatial variability. Compared with the responses from finite source systems (DC or CSEM), MT response is simple. The only variable in an array configuration is the density of sample points for the E and H measurements over the surface (or the subsea bottom). On land, it is practically impossible to sample E and H continuously on a grid as would be necessary to recover the complete details of the response and hence to recover the most information on the conductivity distribution. The marine system described herein, on the other hand, can recover the data to a degree never before possible.

The CSEM system is capable of multiple illuminations of the subsurface from a multitude of source positions. In addition, a CSEM system can generate inductive fields as well as DC fields. With these capabilities, a CSEM system can often provide better information than can MT. The advantage of a CSEM system derives from the fact that the induced currents of the alternating source have a different spatial configuration that is not available from DC or MT fields.

With DC (zero frequency), the responses depend only on the spatial configurations of the fields. In contrast, with AC used in the inductive methods (e.g., MT and CSEM), the responses also depend on the AC frequency.

While each of these methods can provide information about the subsurface conductivities, it is desirable to have methods that can provide more reliable and detailed information about the subsurface conductivities.

SUMMARY OF INVENTION

In one aspect, the present invention relates to subsurface imaging cables having a plurality of sensor modules and a flexible medium connecting the plurality of sensor modules. A subsurface imaging cable of the invention includes a plurality of sensor modules, wherein the plurality of the sensor modules are flexible and each of the plurality of sensor modules is spaced apart on the subsurface imaging cable at a selected distance; and a flexible medium connecting the plurality of the sensor modules, wherein the subsurface imaging cable is flexible and adapted to be wound on a reel.

In another aspect, the invention relates to flexible sensor modules for subsurface imaging. a flexible sensor module of the invention includes a flexible casing; and at least one sensor selected from the group consisting of a flexible electric sensor, a flexible magnetic sensor, and a flexible seismic sensor, wherein the at least one sensor is enclosed in the flexible casing.

In another aspect, the present invention relates to flexible electric sensors for subsurface imaging. A flexible electric sensor of the invention includes a flexible casing, the flexible casing is water permeable; a flexible electrode enclosed in the flexible casing; and a filler enclosed in the flexible casing.

In another aspect, the present invention relates to flexible magnetic sensors for subsurface imaging. A flexible magnetic sensor of the invention includes a core of magnetically permeable material; a plurality of coils would around the core; and a flexible enclosure enclosing the core and the plurality of the coils.

In another aspect, the invention relates to a method for determining subsurface conductivity. A method of the invention includes acquiring reference electric and magnetic measurements, the reference electric and magnetic measurements each comprise two orthogonal components; acquiring a plurality of single-direction electric and magnetic measurements, each of the plurality of the single-direction electric and magnetic measurements comprises a same directional component; and determining a subsurface conductivity distribution from the reference electric and magnetic measurements and the plurality of the single-direction electric and magnetic measurements.

In another aspect, the invention relates to a method for determining subsurface conductivity images. A method for subsurface imaging of the invention includes acquiring direct-current measurements at a plurality of sites in a survey area; acquiring a first set of electric and magnetic measurements from natural electromagnetic fields at the plurality of sites; acquiring a second set of electric and magnetic measurements using controlled electric and magnetic sources at the plurality of sites; and determining a subsurface conductivity distribution from the direct-current measurements, the first set of electric and magnetic measurements, and the second set of electric and magnetic measurements.

Other aspects and advantages of the invention will be apparent from the following description and the appended claims.

DETAILED DESCRIPTION

Figure 1:
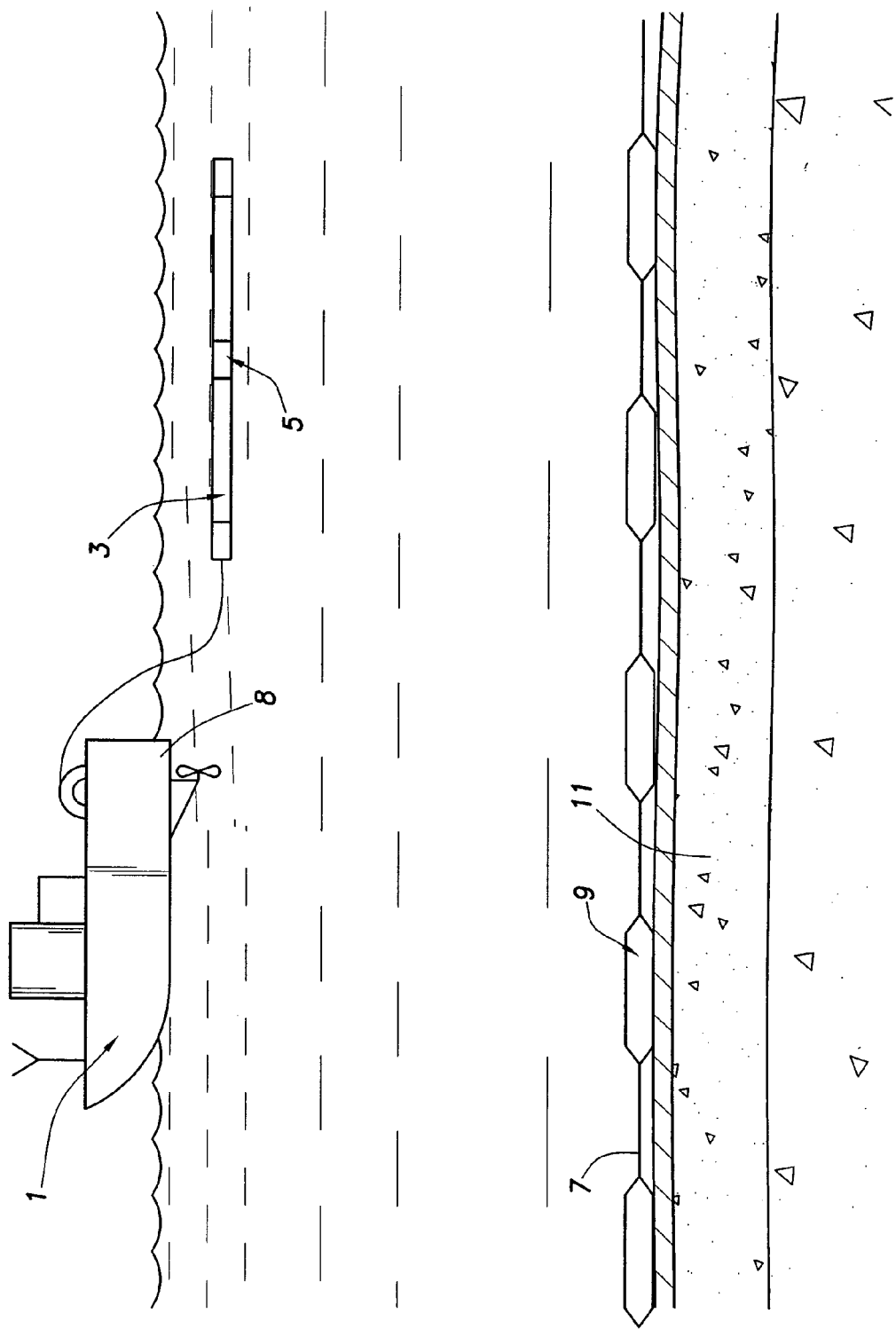
FIG. 1 shows a prior art marine seismic measuring system.

The theory and practice of the above methods for mapping the distribution of electrical conductivity of the earth formations form the basis of the present invention. The present invention relates to methods and apparatuses that use a high degree of spatial coverage to provide information about the resistivity distribution. In particular, the present invention provides methods that can be used in inhomogeneous formations. In one embodiment, the present invention provides a measurement system that includes several resistivity methods in a single sensor array to determine resistivities of the earth formations.

The spatial configurations of the inducing currents or fields, and of the secondary fields, in these methods may be described by their spatial Fourier transforms. Accordingly, the subsurface conductivity distribution may be described by a superposition of spatial sinusoids known as wavenumbers, which are the spatial equivalents of the frequencies in temporal variation. With the spatial Fourier transform concept, it is clear that maximum information about subsurface conductivity distribution can be obtained when the sources have the broadest possible wavenumber contents and the spatial samplings of the responses measure the broadest possible wavenumbers of the secondary fields.

In this context, it can be appreciated that a combination of DC, MT (which has a zero wavenumber source field), and CSEM can provide a range of wavenumbers beyond what can be provided by each individual system. The mathematical statement of the system described herein is that the dense measurement sampling allows broadband wavenumber recovery of the secondary fields, while the multiplicity of source types, with equally dense locations, provides unprecedented source fields or illumination wavenumbers.

One embodiment of the invention combines a DC resistivity apparatus, a magnetotelluric apparatus (MT), and a Controlled Source apparatus (CSEM), in a single measurement system/cable. Using such a measurement system, multiple measurements (DC, IP, MT, and CSEM) can be acquired simultaneously. Methods of the invention acquire data from large arrays of receivers and, for CSEM, arrays of transmitters.

Importantly the present invention takes advantage of the fact that long cables, such as those used in marine seismic survey, can be dragged over the ocean floor by surface ships. If equipped with separated electrodes and in-line magnetic sensors, these cables can be positioned in various manners to provide arrays of virtually any size and shape. In a particular embodiment, a subsurface conductivity imaging cable has at spaced apart locations sensor modules having magnetic and/or electric sensors. A subsurface conductivity imaging cable of the invention can be extended over a wide area to provide dense and accurate spatial coverage. Once the cable is pulled taut and draped over an earth formation, it is possible to determine the exact location of each electric dipole electrode or magnetic sensor coil relative to other electrodes or coils on the cable.

Furthermore, electrodes or solenoids carrying alternating current can be incorporated in these cables to provide sources for the controlled-source surveys. The CSEM sources can be driven with broadband frequencies, including DC for the electric dipoles, to provide complete frequency coverage. The CSEM systems can be operated in transient mode (time domain) or frequency mode (frequency domain) to achieve the necessary bandwidth. The electric-electric dipole arrays may be used to measure the IP effect in sub-bottom rocks.

Figure 2:
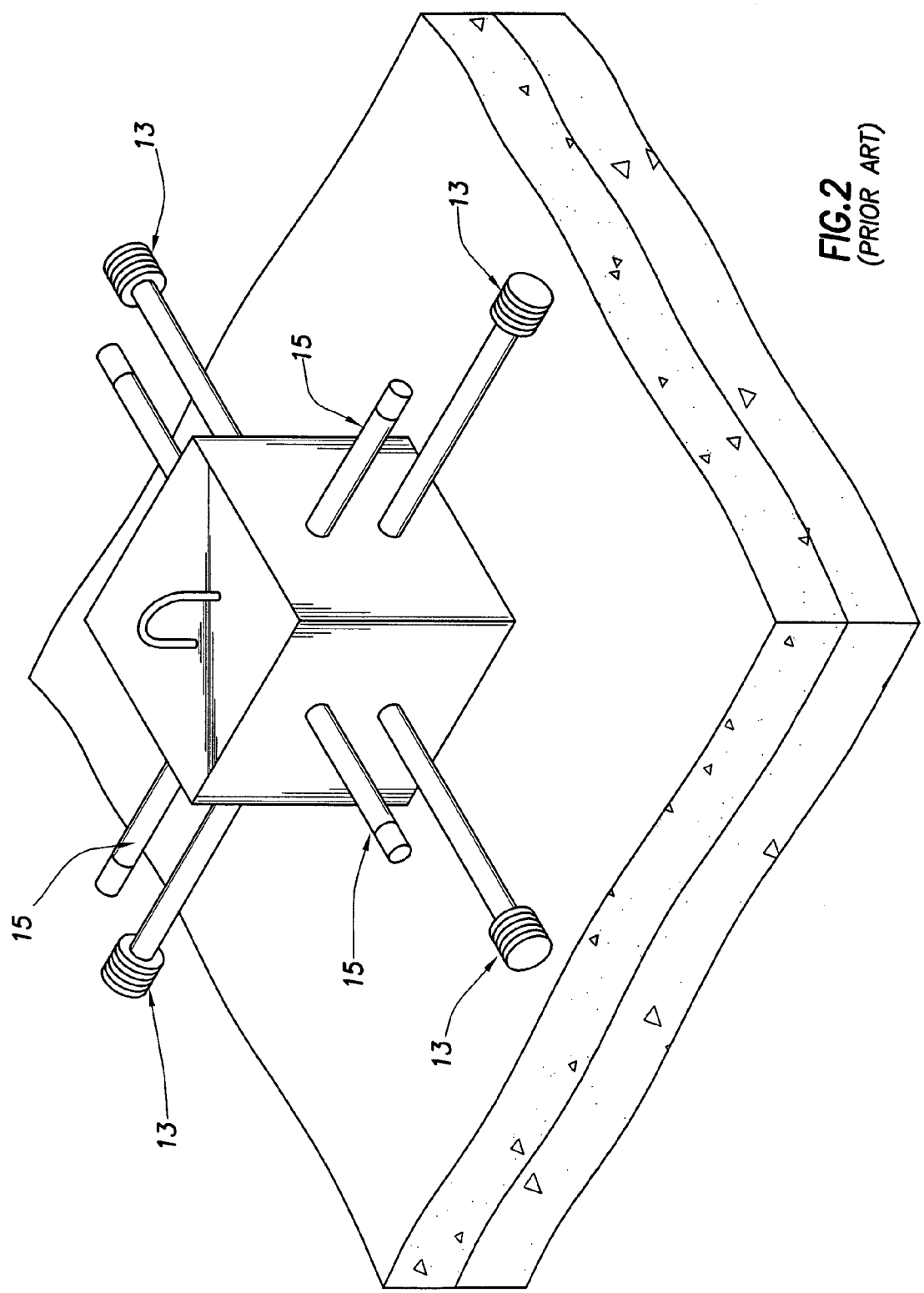
FIG. 2 shows a prior art MT measuring apparatus.
Figure 3:
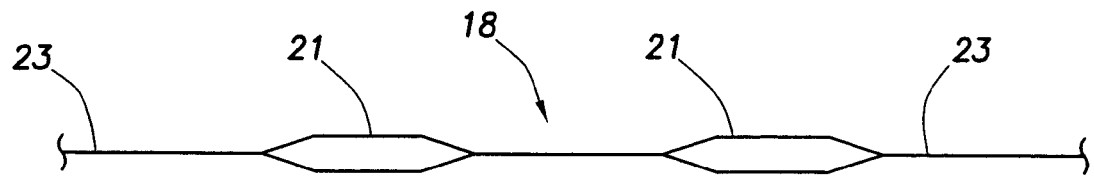
FIG. 3 shows a schematic diagram of a subsurface imaging cable in accordance with one embodiment of the invention.

FIG. 3 shows a schematic illustration of a subsurface imaging cable in accordance with one embodiment of the invention. In FIG. 3, a subsurface conductivity imaging cable (18) includes at spaced apart locations sensor modules (21) connected by flexible media (23). In preferred embodiments these cables are based on seismic cables or the like. Seismic cables have great lengths (typically 6 Km or longer) and have multiple sensor modules on each cable. The distance between adjacent sensor modules (21) can range from tens, for example 30 meters, to hundreds of meters. The great distances between the sensor modules makes it possible to measure electric responses having dipole lengths of many tens or hundreds of meters. The use of dipole length of 100 meters would provide a signal-to-noise ratio gain of 10 or more as compared to a conventional electric sensor used in current marine systems shown in FIG. 2, which has a dipole length of 10 meters or less. Furthermore, as noted above, in some embodiments, the subsurface imaging cable (18) may also include electric and/or magnetic field sources to facilitate simultaneous DC, IP, MT, and CSEM measurements.

Figure 4:
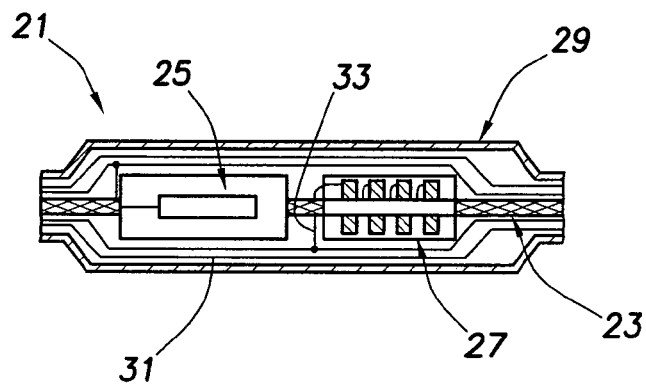
FIG. 4 shows a sensor module in accordance with one embodiment of the invention.
Figure 5:
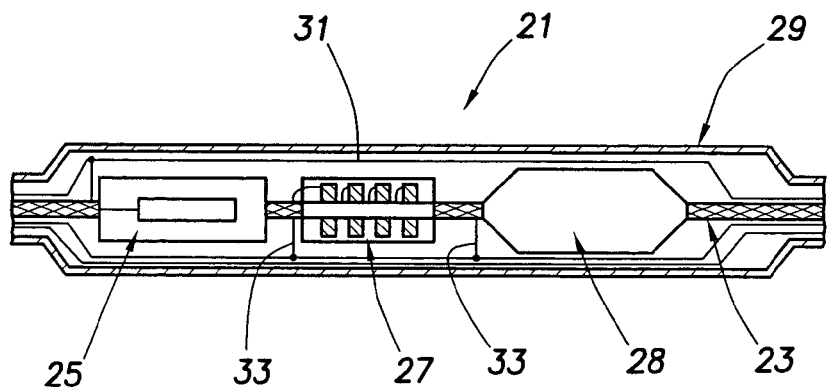
FIG. 5 shows a sensor module in accordance with another embodiment of the invention.

A sensor module (21) may include different types of sensors. For example, FIG. 4 shows a sensor module (21) that includes an electric sensor (25) and a magnetic sensor (27) enclosed by an exterior tube (29). The sensor module (21) also has conductors (31) running therethrough. The conductors (31), through electrical connections (33), transmit the signals detected by the sensors to a processing station (not shown). FIG. 6 shows another embodiment of the sensor module (21) that further includes a seismic sensor (28). With such a sensor, it is possible to combine the seismic survey with the induction-resistivity surveys.

Some embodiments of the invention include a flexible sensor module (21) such that the subsurface imaging cable (18) shown in FIG. 3 may be wound on a reel for easy deployment. In these embodiments, the exterior tube (29) may be made of various flexible materials, such as polyethylene. Similarly, the electric sensor (25), the magnetic sensor (27) and the seismic sensor (28) may also be made of flexible materials.

Various seismic sensors are known in the art. For example, geophones are used in both onshore and on the seabed offshore seismic surveys. Hydrophones, unlike geophones, detect changes in pressure rather than motions. Seismometers record seismic energy in the form of ground motion and transform it to an electrical impulse. All these sensors may be used with embodiments of the present invention.

Figure 6A:
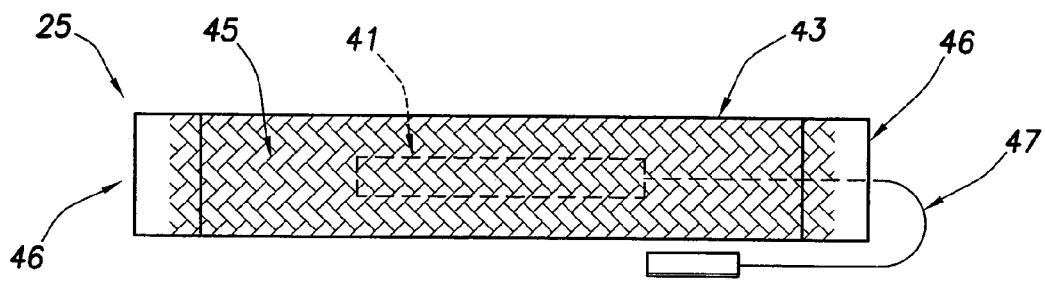
FIG. 6A shows a flexible electric sensor in accordance with one embodiment of the invention.
Figure 6B:
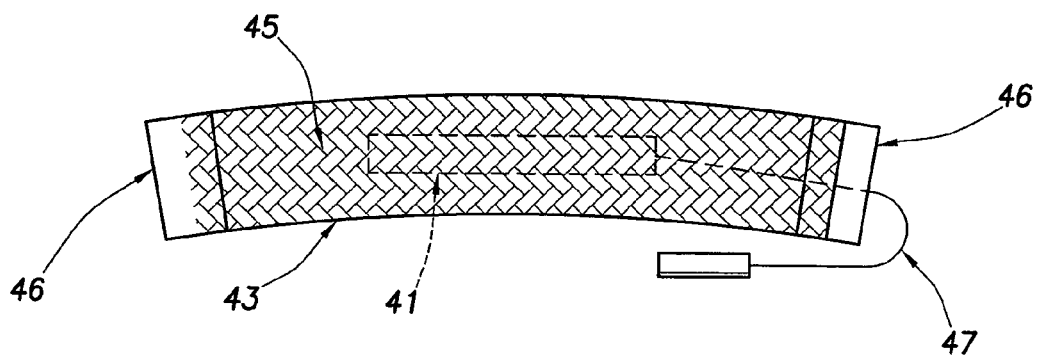
FIG. 6B illustrate the flexible nature of the electric sensor of FIG. 7A.
Figure 7A:
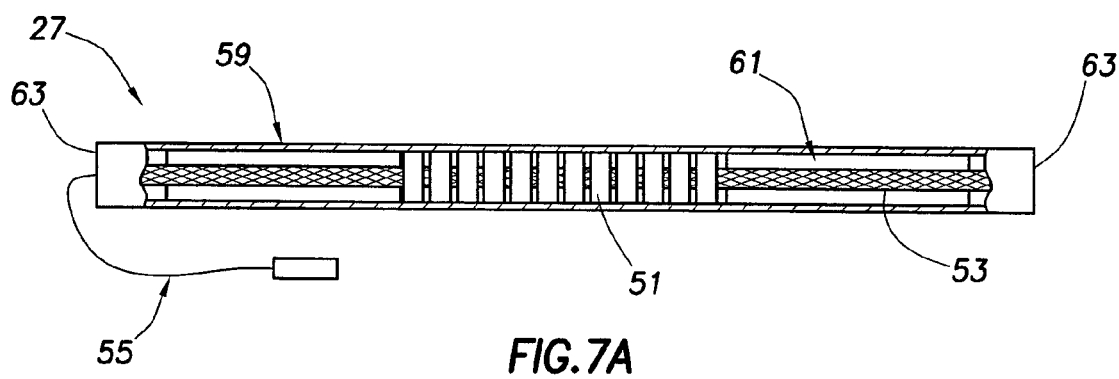
FIG. 7A shows a flexible magnetic sensor in accordance with one embodiment of the invention.
Figure 7B:
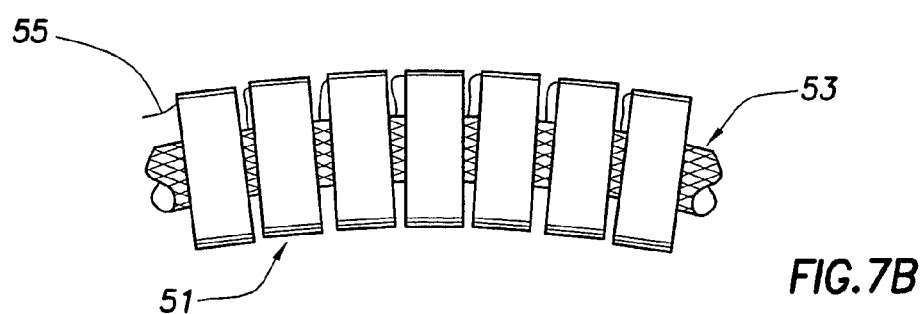
FIG. 7B illustrate the flexible nature of the magnetic sensor of FIG. 8A.

FIG. 6A shows an electric sensor (25) in accordance with one embodiment of the invention, and FIG. 7B illustrates the flexible nature of such an electric sensor (25). The electric sensor (25) includes an electrode (41) enclosed in a casing (43) made of a flexible material and filled with a flexible filler (45). The casing (43) is water permeable. For example, the casing (43) may be a cylindrical perforated polymer casing filled with compressed polyurethane foam. The casing (43) is capped with plugs (46) located at the cylinder ends. The electrode (41) can be located at any location within the casing (43) and surrounded by the filler (45). An electric conductor (47) that transmits the electric signals registered by electrode (41) may exit the casing (43) at any location. The electrode (41) can be any suitable electrode known in the art, for example, the electrode (41) may be a silver-silver chloride electrode immersed in a gelled 3–4% KCL solution. In this embodiment, the gel is held inside a porous material. Although porous ceramic may be used, this material is susceptible to impact fracturing. In preferred embodiments, the electrode (41) is enclosed in flexible porous materials, such as 40 micron pore size high density polyethylene or Teflon with suitable porosity. While FIGS. 6A and 6B show an exemplary electric sensor, one skilled in the art would appreciate that other alternative structures are possible. For example, the casing (43) may be a uni-body structure without end caps, i.e., the plugs (46) are integral parts of the casing (43).

FIG. 7A shows a magnetic sensor (27) according to one embodiment of the invention, and FIG. 7B illustrates the flexible nature of the major components of such a magnetic sensor (27). The magnetic sensor (27) may comprise one or more coils (51) mounted on a core (53). In alternative embodiments, the magnetic sensor (27) may comprise the coils (51) without a core. The core (53) may comprise a permeable flexible material, such as a magnetically permeable wire. The coils (51) are connected in series to a conductor (55) which exits a casing (59) that encloses the coils (51) and the core (53). The multiple coils (51) structure allows the sensor to be flexible as long as the core (53) is flexible. In anticipation that the magnetic sensor (27) operates under substantial pressure at sea floor, the casing (59) may be compensated with a fluid (61) (such as oil). In accordance with an embodiment of the invention, the casing is a cylindrical polymer casing (59) sealed at its ends by plugs (63). Alternatively, the plugs (63) may be integral parts of the casing (59).

The above described are examples of electric sensors (25) and magnetic sensors (27) that may be included in a subsurface imaging cable (18) according to the invention. Alternatively, these cables may be provided with ports or plugs, into which magnetic or electric sensors are to be connected. The magnetic and electric sensors can then be attached to the cables with prior to or while the cables are deployed from the ship. This alternative approach has the advantage of uniform manufacturing of the cables and various sensors may be mixed and matched depending on the surveys to be performed. These sensors may be used to perform DC measurements, IP measurements, MT measurements, and/or CSEM measurements. Depending of the types of measurements desired, it may be advantageous to mix and match different types of sensors in the same sensor module or on the same cable. One skilled in the art would appreciate that other types of sensors may also be used. For example, the magnetic sensor (27) may comprise either magnetoresistive sensors that include Wheatstone circuits, or fluxgate magnetometers. In addition, it is possible to include more than one type of magnetic sensors (27) or more than one type of electric sensors (25) on a single subsurface imaging cable (18). Furthermore, a sensor module (21) does not have to include multiple sensors. Alternative configurations are possible. For example, a subsurface imaging cable (18) may have electric sensors (25) and magnetic sensors (27) arranged in alternate sensor module (21). In yet another configuration, the seismic sensors may be provided on a conventional seismic cable that is deployed along side a subsurface imaging cable (18) having electric sensors (25) and magnetic sensors (27). This particular arrangement can achieve the same results as a cable having three sensors on the same cable or in same sensor module (e.g., FIG. 6).

Figure 8:
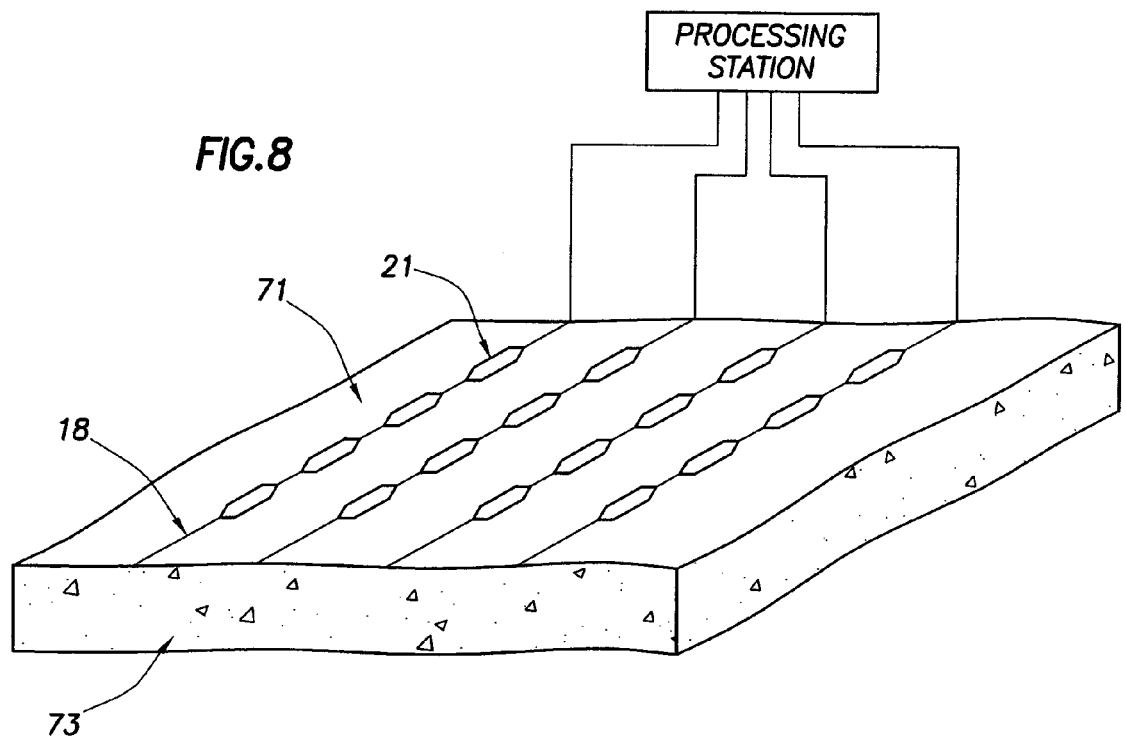
FIG. 8 shows a subsurface imaging system in accordance with one embodiment of the invention.

FIG. 8 shows a subsurface imaging system in accordance with one embodiment of the invention. Subsurface conductivity imaging cables (18) in accordance with the invention, are laid, for example, side by side to form an array (71) that covers the survey area on the earth formation (73). The subsurface conductivity imaging cables (18) can cover the ocean floor or the land or form a transition system going from land to under the sea as shown in FIG. 1. While FIG. 8 shows multiple subsurface imaging cables (18), it is also possible to use a single long subsurface imaging cable to lay out the desired array (71). Furthermore, in some embodiments of the invention, one or more subsurface imaging subsurface imaging cables (18) may be laid in orthogonal directions to form a grid for measuring the electric or magnetic fields in the orthogonal directions (e.g., $E_x$, $E_y$, $H_x$, and $H_y$).

With the subsurface imaging cables (18) of the invention, it is possible to perform multiple types of measurements (e.g., DC, IP, MT, and CSEM) essentially simultaneously. With multiple types of measurements available, it is possible to combine them in a single inversion to derive the subsurface conductivity image. The multiple measurements can compensate for the short comings of individual measurements, and hence make the derived solution more reliable. Furthermore, the great lengths of these cables permit maximum coverage of the survey area for maximum definition of the subsurface resistivity structure. As stated above, broad coverage is important for deriving an accurate subsurface conductivity distribution.

For MT, the conductivity distribution in the ground can be determined by inverse transformation of the product of the spatial transform of the observed field and a function of the wave numbers in the half space and the air (or sea water, in case of a see floor survey). There are special considerations when using a cable of the invention in MT measurements.

As shown in FIG. 2, a conventional MT detector has a pair of orthogonal electric sensors (13) and a pair of orthogonal magnetic sensors (15). In contrast, the electric sensors (25) and the magnetic sensors (27) of a subsurface imaging cable (18) of the invention are all disposed along the direction of the cable. Thus, these subsurface imaging cables can only measure one component (e.g., $E_x$ or $H_x$) of the electric or magnetic fields. However, one or more of these cables may be arranged in orthogonal directions to achieve measurements of orthogonal components (e.g., $E_x$ and $E_y$, or $H_x$ and $H_y$). Even if the measurements are acquired only in a single direction (e.g., $E_x$ or $H_y$), it is still possible to derive the subsurface conductivity distribution from the measurements (see below).

The fact that any field components spread over the survey areas can be used to derive conductivity distribution can be shown from a basic statement of the induction problem. The invariance of the MT impedance implies a uniform source field that can be represented by two orthogonal horizontal and independent magnetic fields. All observed fields can be expressed through a linear transfer function:

$$\begin{vmatrix} E_{1x}^{obs} \\ E_{1y}^{obs} \\ H_{1x}^{obs} \\ H_{1y}^{obs} \\ E_{2x}^{obs} \\ \vdots \end{vmatrix} = \begin{vmatrix} T_{xx}^E & T_{xy}^E \\ T_{yx}^E & T_{yy}^E \\ T_{xx}^H & T_{xy}^H \\ T_{yx}^H & T_{yy}^H \\ \vdots & \vdots \end{vmatrix} \cdot \begin{vmatrix} H_x^{inc} \\ H_y^{inc} \end{vmatrix}$$

where $H_x^{inc}$ and $H_y^{inc}$ are the two orthogonal horizontal, independent magnetic fields representing the uniform source field, and $E_{ni}^{obs}$ and $H_{ni}^{obs}$ represent the observed electric fields and the magnetic fields, respectively, at the n-th site in the i-th direction.

This provides a means to derive the usual impedance relation for the observed fields:

$$\begin{vmatrix} E_x^{obs} \\ E_y^{obs} \end{vmatrix} = \begin{vmatrix} T_{xx}^E & T_{xy}^E \\ T_{yx}^E & T_{yy}^E \end{vmatrix} \cdot \begin{vmatrix} H_x^{inc} \\ H_y^{inc} \end{vmatrix} \text{ and } \begin{vmatrix} H_x^{obs} \\ H_y^{obs} \end{vmatrix} = \begin{vmatrix} T_{xx}^H & T_{xy}^H \\ T_{yx}^H & T_{yy}^H \end{vmatrix} \cdot \begin{vmatrix} H_x^{inc} \\ H_y^{inc} \end{vmatrix}$$

These equations may be rearranged to provide a relationship between the observed electric fields and the observed magnetic fields:

$$\begin{vmatrix} E_x^{obs} \\ E_y^{obs} \end{vmatrix} = \begin{vmatrix} T_{xx}^E & T_{xy}^E \\ T_{yx}^E & T_{yy}^E \end{vmatrix} \cdot \begin{vmatrix} T_{xx}^H & T_{xy}^H \\ T_{yx}^H & T_{yy}^H \end{vmatrix}^{-1} \cdot \begin{vmatrix} H_x^{obs} \\ H_y^{obs} \end{vmatrix}$$

$$= \begin{vmatrix} Z_{xx} & Z_{xy} \\ Z_{yx} & Z_{yy} \end{vmatrix} \cdot \begin{vmatrix} H_x^{obs} \\ H_y^{obs} \end{vmatrix}$$

This equation shows how two components can be related to any other two components by a similarly derived tensor. For example, magnetic field measurements at site 1 and site 2 can be correlated as follows:

$$\begin{vmatrix} H_{1x}^{obs} \\ H_{1y}^{obs} \end{vmatrix} = \begin{vmatrix} T_{xx}^H & T_{xy}^H \\ T_{yx}^H & T_{yy}^H \end{vmatrix} \cdot \begin{vmatrix} H_{2x}^{obs} \\ H_{2y}^{obs} \end{vmatrix}$$

The fields represented in this manner do not have to be neatly arranged as orthogonal pairs on a regular grid. The inversion program can find a conductivity distribution that satisfies the transfer functions relating the fields at a multitude of sites. All that is required is that the fields are referenced to a site that has complementary fields: E's should be referenced to H's or H's to E's. Otherwise, the model can only reflect relative changes in conductivity not absolute conductivities.

For example, orthogonal E fields (e.g., $E_x$ and $E_y$) may be measured at one site as reference and a grid of magnetic field measurements are then used to derive the conductivity distribution. The grid of magnetic measurements may be acquired using orthogonal detectors at each site. Alternatively, these measurements may be acquired with a subsurface imaging cable (18) of the invention, as shown in FIG. 3. When using the subsurface imaging cable (18) of the invention, all magnetic sensors align in the same direction as the cable. One may deploy these cables in the x coordinate direction then in the y coordinate direction to obtain orthogonal measurements at multiple sites—not necessarily at the same site for the x and y direction measurements. In this manner an enormous grid of orthogonal properly spaced magnetic field sensors could be assembled by a single ship dragging a long cable from place to place on the sea bottom. Any particular magnetic components, e.g., $H_{xi}$, is related to the reference electric fields via the equation:

$$H_{xi} = T_{xxi}^{HE} E_x^{ref} + T_{xyi}^{HE} E_y^{ref}$$

where T's are the invariant transfer functions that depend only on the geological model. The $H_{xi}$ components do not have to be measured at the same time as the $H_{yi}$ components. The inversion of this data set would require finding the conductivity distribution that produces values of $T^{HE}$ that provide the best fit to the data.

For general applications, where the ocean bottom may be of unknown or highly variable conductivity, a better design is to also include spaced apart electrodes in the cable and to include magnetic fields in the reference so that both $T^{HH}$ and $T^{HE}$ transfer functions may be obtained. The $T^{HE}$ function corresponds to the conventional impedance function. The inversion algorithm then has to find a conductivity model that fits both transfer functions simultaneously, providing a higher resolution solution than that using one set of transfer functions alone.

Even if only one component (e.g., $E_x$ or $H_x$) is measured, it is possible to derive formation conductivity from the single-direction measurements, if at least one fixed electric and magnetic reference (E-H reference) measurement is available.

Figure 9:
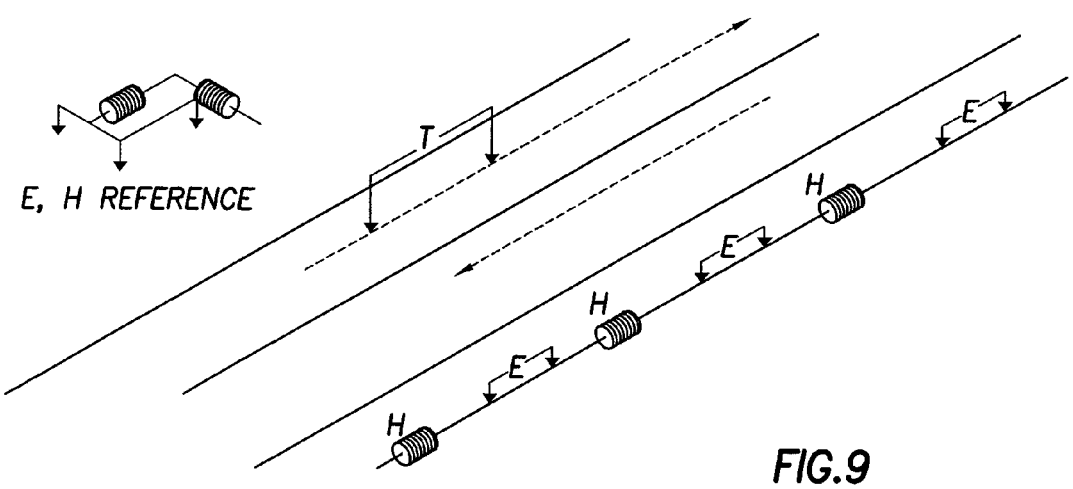
FIG. 9 shows a schematic for subsurface imaging using cables for measuring electric and magnetic fields in a single direction.

FIG. 9 shows a schematic of a conductivity survey using single-direction $E_x$ and $H_x$ measurements, together with E-H reference measurements. In this particular arrangement, the source electric field (shown as T) parallels the cable direction (sensor direction). This particular configuration is referred to as the "TE mode." If a magnetic field source is used in parallel with the cable direction (sensor direction), it is referred to as the "TH mode." The filters used for spatial transformation of the observed data are different depending on whether the data are obtained in the TE mode or the TH mode. In addition, to have maximum resolution, it is often necessary to have multiple polarizations of the field in the TH mode. The transfer function $T_{ij}$ in a tensor relating the measured E's and H's in a single-direction measurement to the E-H reference measurements acquired at a reference site are functions only of the subsurface resistivity distribution:

$$H_{x'} = T_{xx}^{HE} E_x^R + T_{xy}^{HE} E_y^R$$

$$H_{x'} = T_{xx}^{HH} H_x^R + T_{xy}^{HH} H_y^R$$

$$E_{x'} = T_{xx}^{EE} E_x^R + T_{xy}^{EE} E_y^R$$

$$E_{x'} = T_{xx}^{EH} H_x^R + T_{xy}^{EH} H_y^R$$

where $E_{x'}$ and $H_{x'}$ are the electric and magnetic fields, respectively, measured in the x' direction, and $E_x^R$, $E_y^R$, $H_x^R$, and $H_y^R$ are the reference electric and magnetic measurements in the x or y direction, respectively. The analysis process to find the conductivity distribution of the formation from the single-direction measurements (e.g., $E_{x'}$ and $H_{x'}$) would involve fitting a conductivity model that produces the best fit to the $T_{ij}$ values in the above equations.

In the general 3-D modeling codes used for the interpretation of induction measurement data, the inversion algorithm can be written to find the best fit to the $T_{ij}$ values just as well as it can find a best fit to the impedance ($E_i/H_j$) values which are used in current MT surveys. Note that this is possible only when there is dense spatial sampling of the E and H fields. Otherwise, there might not be enough sampling of the fields to define the $T_{ij}$ values well enough to get a good model. Dense sampling of the E and H fields is possible with the subsurface imaging cables of the present invention.

The above description applies to both MT and CSEM measurements. The MT and CSEM measurements can be combined in a single inversion to derive subsurface conductivity distributions. The advantage of combining these two types of measurements include the possibility of using MT to correct for background signals in the CSEM measurements. One of the sources of noises during a CSEM measurements is from the magnetotelluric fields. Knowing the reference site's magnetotelluric fields makes it possible to subtract the magnetotelluric fields from the measured electric magnetic field using a CSEM method. Moreover, signal processing can separate the MT signals from the CSEM signals because the MT signals occur randomly and the CSEM fields can be time synchronized.

The electric and magnetic field source for the CSEM method in accordance with the invention, can be a source that consists of a subsurface conductivity imaging cable having electric and magnetic field sources. For example, in some embodiments, a source cable may be deployed close to at least one of the subsurface conductivity imaging cable in order to emit electric and magnetic fields. The source cable can be, for example, moved parallel to at least one of the subsurface conductivity imaging cable that measure the scattered electric and magnetic fields.

In one or more embodiments, the present invention is advantageous in that increasing the distance between the electric sensors provides an increase in dipole lengths, hence the signal to noise (S/N) ratio because the S/N of an EM receiver improves with increasing dipole lengths. A typical dipole length for a conventional marine MT system is about 10 m. An advantage of using seismic cable systems to include electric and magnetic sensors for EM measurements is that the separation between the EM receivers can be on the order of one hundred meters. A dipole length of 100 meters would provide a S/N gain of 10 because the length of the dipole is ten times longer than the dipole length of a conventional MT apparatus. In other embodiments, the invention provides flexible magnetic sensors that can be included in a cable that is to be wound on a reel for easy deployment.

Advantages of the invention also include the possibility of simultaneously acquiring different types of measurements. The different types of measurements can be used in a single inversion to compensate for each other's short comings and to provide background correction (e.g., removal of MT contribution in the CSEM). Furthermore, the invention provides a method that can derive subsurface conductivity distribution from single-direction measurements (e.g., $E_x$ and $H_x$ only). This method combined with the subsurface imaging cable of the invention makes it possible to use a long cable on a reel for easy deployment and wide and dense coverage of the survey areas. With wide and dense coverage, it is possible to derive high resolution conductivity distribution of the formations, in particular the formations with inhomogeneous conductivity distributions.

While the invention has been described with respect to a limited number of embodiments, those skilled in the art, having benefit of this disclosure, will appreciate that other embodiments can be devised which do not depart from the scope of the invention as disclosed herein. For example, although the cable of the invention is described as having sensor modules that include electric sensors, magnetic sensors, and/or seismic sensors, one skilled in the art would appreciate that other types of sensors or dummy modules (i.e., without sensors) may be included on the cable without departing from the scope of the invention. Thus, a "sensor module" as used herein refers to only the module having at least one of the above-described sensors; it does not exclude the presence of other sensor modules (including dummy modules) on the cable. Furthermore, while the description uses marine conductivity surveys to illustrate the advantages of the invention, one skilled in the art would appreciate that embodiments of the invention may also be applied in land conductivity surveys. In yet another embodiment the long undersea cable would be provided with ports or plugs into which the magnetic or electric sensors would be connected. These sensors may be attached to the cables prior to or while the cable is deployed from the ship. This embodiment would have the advantage of uniform manufacture for all or any sensor configuration. Accordingly, the scope of the invention should be limited only by the attached claims.

What is claimed is:

1. A method for aquiring subsurface images, comprising:
   acquiring reference electric and magnetic measurements at a reference site using the natural electromagnetic field;
   acquiring a first set of electric and magnetic measurements in a survey area comprising a plurality of single-direction electric and magnetic measurements, each of the plurality of single-direction electric and magnetic measurements comprises a same directional component;
   acquiring a second set of electric and magnetic measurements using controlled electric and magnetic sources; and
   determining in a single inversion a subsurface conductivity distribution from the first set of electric and magnetic measurements and the second set of electric and magnetic measurements by correlating the plurality of the single-direction electric and magnetic measurements with the reference electric and magnetic measurements according to the following equations:

$$H_{x'} = T_{xx}^{HE} E_x^R + T_{xy}^{HE} E_y^R$$

$$H_{x'} = T_{xx}^{HH} H_x^R + T_{xy}^{HH} H_y^R$$

$$E_{x'} = T_{xx}^{EE} E_x^R + T_{xy}^{EE} E_y^R$$

$$E_{x'} = T_{xx}^{EH} H_x^R + T_{xy}^{EH} H_y^R$$

wherein $E_{x'}$ and $H_{x'}$, respectively, represent each of the plurality of the single-direction electric and magnetic measurements, and $E_x^R$, $E_y^R$, $H_x^R$, and $H_y^R$ represent orthogonal components of the reference electric and magnetic measurements, and $T_{xx}^{HE}$, $T_{xy}^{HE}$, $T_{xx}^{HH}$, $T_{xy}^{HH}$, $T_{xx}^{EE}$, $T_{xy}^{EE}$, $T_{xx}^{EH}$, and $T_{xy}^{EH}$ represent components of an impedance tensor function;

wherein the acquiring the first set of electric and magnetic measurements and the acquiring the second set of electric and magnetic measurements are performed with at least one subsurface imaging cable comprising a plurality of sensor modules spaced apart at a selected distance on the subsurface imaging cable, wherein the plurality of sensor modules are flexible such that the subsurface imaging cable is flexible and is adapted to be wound on a reel.

2. The method of claim 1, wherein the first set of electric and magnetic measurement each comprises two orthogonal components.

* * * * *